(12) United States Patent
Yellin et al.

(10) Patent No.: US 9,973,800 B2
(45) Date of Patent: May 15, 2018

(54) MERCHANDISING STREAMING VIDEO CONTENT

(75) Inventors: Todd Scot Yellin, Los Gatos, CA (US); Thomas Purnell-Fisher, Los Gatos, CA (US); Matt Marenghi, Portola Valley, CA (US)

(73) Assignee: NETFLIX, INC., Los Gatos, CA (US)

( * ) Notice: Subject to any disclaimer, the term of this patent is extended or adjusted under 35 U.S.C. 154(b) by 59 days.

(21) Appl. No.: 13/205,377

(22) Filed: Aug. 8, 2011

(65) Prior Publication Data

US 2013/0042271 A1    Feb. 14, 2013

(51) Int. Cl.

| | |
|---|---|
| H04N 5/445 | (2011.01) |
| G06F 3/048 | (2013.01) |
| G06F 15/16 | (2006.01) |
| H04N 21/258 | (2011.01) |
| H04N 5/765 | (2006.01) |
| H04N 21/25 | (2011.01) |
| H04N 21/431 | (2011.01) |
| H04N 21/442 | (2011.01) |
| H04N 21/45 | (2011.01) |
| H04N 21/482 | (2011.01) |

(Continued)

(52) U.S. Cl.
CPC ....... *H04N 21/25866* (2013.01); *H04N 5/765* (2013.01); *H04N 21/251* (2013.01); *H04N 21/4312* (2013.01); *H04N 21/44222* (2013.01); *H04N 21/4532* (2013.01); *H04N 21/482* (2013.01); *H04N 21/4882* (2013.01); *H04N 21/6125* (2013.01); *H04N 21/8549* (2013.01); *H04N 5/45* (2013.01); *H04N 5/782* (2013.01); *H04N 9/8205* (2013.01); *H04N 9/8227* (2013.01); *H04N 21/4782* (2013.01)

(58) Field of Classification Search
CPC ....................................................... H04N 5/45
See application file for complete search history.

(56) References Cited

U.S. PATENT DOCUMENTS 6,286,104 B1 * 9/2001 Buhle et al. .................... 726/4
7,752,265 B2   7/2010 Svendsen et al.
(Continued)

FOREIGN PATENT DOCUMENTS

| WO | 02071749 A1 | 9/2002 |
|---|---|---|
| WO | 2004064296 A2 | 7/2004 |

OTHER PUBLICATIONS

Alan Hanjalic, "Extracting Moods from Pictures and Sounds"; IEEE Signal Processing Magazine, Mar. 2006.*
(Continued)

*Primary Examiner* — James R Marandi
(74) *Attorney, Agent, or Firm* — Artegis Law Group, LLP

(57) ABSTRACT

Techniques are described for merchandising streaming media content to viewers in an engaging manner. A streaming media device may provide a content browsing interface configured to merchandise a set of streaming media titles to a viewer. Rather than rely solely on scrolling lists, titles, box shots, or other metadata associated with the titles available in the streaming media library, the content browsing interface merchandises the library by presenting short merchandising previews of the titles. Doing so creates an engaging content browsing experience where viewers are presented with the actual content of titles available from a streaming media service.

16 Claims, 11 Drawing Sheets

(51) Int. Cl.
    *H04N 21/488*     (2011.01)
    *H04N 21/61*     (2011.01)
    *H04N 21/8549*     (2011.01)
    *H04N 5/45*     (2011.01)
    *H04N 5/782*     (2006.01)
    *H04N 9/82*     (2006.01)
    *H04N 21/4782*     (2011.01)

(56) References Cited

U.S. PATENT DOCUMENTS

| | | | |
|---|---|---|---|
| 2003/0126605 A1 | 7/2003 | Betz et al. | |
| 2004/0040041 A1 | 2/2004 | Crawford | |
| 2005/0228806 A1 | 10/2005 | Haberman | |
| 2006/0015904 A1 | 1/2006 | Marcus | |
| 2006/0112352 A1 | 5/2006 | Tseng et al. | |
| 2007/0067724 A1* | 3/2007 | Takahashi | G11B 27/031 715/723 |
| 2007/0222768 A1* | 9/2007 | Geurts et al. | 345/173 |
| 2007/0244984 A1* | 10/2007 | Svendsen | 709/217 |
| 2008/0301579 A1* | 12/2008 | Jonasson et al. | 715/803 |
| 2009/0019489 A1 | 1/2009 | Ohlfs et al. | |
| 2009/0196569 A1 | 8/2009 | Agnihotri et al. | |
| 2010/0037267 A1* | 2/2010 | Bennett | 725/56 |
| 2010/0306806 A1* | 12/2010 | Kim | H04N 7/17318 725/61 |
| 2010/0332497 A1* | 12/2010 | Valliani | G06F 17/30781 707/759 |

OTHER PUBLICATIONS

International Search Report for application PCT/US2012/050006 dated Dec. 6, 2012.
Extended European Search Report for Application No. 12822077.9 dated Jan. 29, 2015.
PS3 Netflix UI w/Preview Box, https://www.youtube.com/watch?v=r1yk5RsS7eo.
Tony Bove, "iPod & iTunes for Dummies", 6th Edition, ISBN: 978-0-470-39062-7, 4 pages.

* cited by examiner

MERCHANDISING STREAMING VIDEO CONTENT

TECHNICAL FIELD

Embodiments presented in this disclosure generally relate to streaming media services. More specifically, embodiments presented herein relate to techniques for merchandising a library of streaming video content to viewers.

BACKGROUND

A streaming media service generally includes a content server, a content player, and a communications network connecting the content server to the content player. The content server is configured to store (or provide access to) media files (or "streams") made available to end users. Each stream may provide a digital version of a feature length film, a television programs, a sporting event, a staged or live event captured by recorded video, etc. Streams also include media content created specifically for distribution online. Content files stored on the content server are typically organized according to playback chronology and store audio data and/or video data.

Media playback by a client device is typically referred as "streaming" because the content server transmits portions of a media file to the client device, which in turn decodes and initiates playback without waiting for the complete stream to be received. To account for variable latency and bandwidth within the communications network, a content buffer on the client device queues incoming portions of the stream ahead of portions actually being played. During moments of network congestion (which leads to lower available bandwidth) less data is added to the buffer, which may drain down as data is being de-queued to support playback at a certain playback bit rate. However, during moments of high network bandwidth, the buffer is replenished and additional buffer time is added until the buffer is generally full again. In practical systems, the buffer may queue data corresponding to a time span ranging from seconds to more than a minute.

Streaming encoded audiovisual (AV) programs over the Internet has become popular as the availability of high-bandwidth Internet communication has increased. From a technical standpoint, a variety of different streaming media protocols are available for transmitting media streams to the client. Although many of these protocols were designed to transmit media streams from a server to a conventional computing system, e.g., a typical desktop PC or laptop computer, or home theatre PC (HTPC), the streaming approach is also being used to transmit streaming media to a variety of end-user client devices; including, e.g., mobile telephones, tablet and net-book computing devices, console and handheld video game systems, digital video recorders (DVRs), DVD players, connected digital TVs, and dedicated media streaming devices, (e.g., the Roku® set-top box), etc.

A user interface on the client device allows users to select a title and begin streaming it. For example, an interface may present a list of titles available for streaming or a user might search for a desired title. Titles can also be presented by category or according to other criteria. The interface might also provide an image of a DVD box cover (referred to as a "box shot") or a promotional poster related to a feature film or a still taken from the video stream. The interface might also provide program guide data, such as a short summary of a plot, a list of actors, directors, etc., along with information related to the particular viewer, such as friends who have watched a particular title or reasons why a viewer might want to watch particular titles (e.g., a recommendation for one title based on viewing another title).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
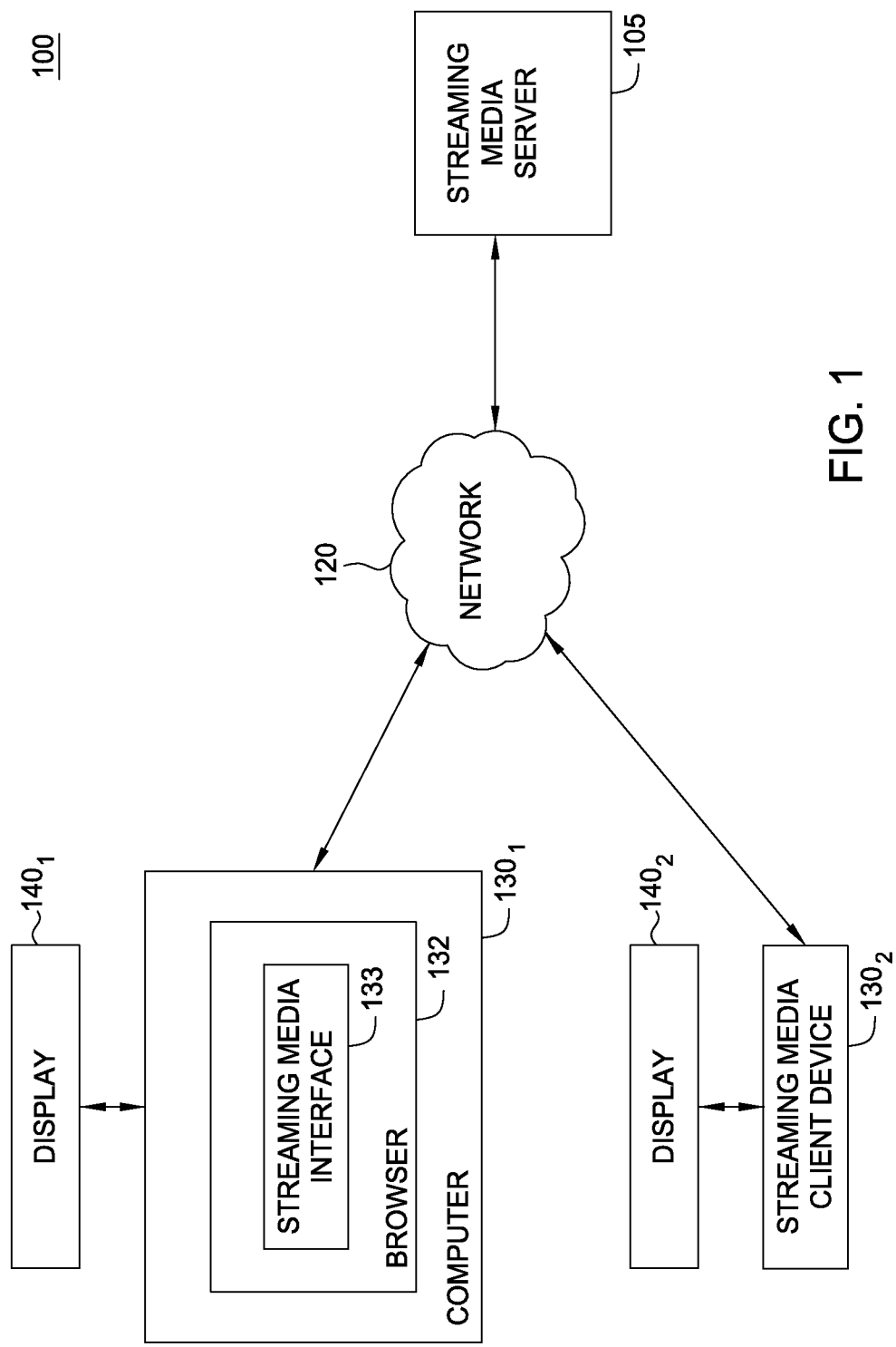
FIG. 1 illustrates an example computing infrastructure used to provide streaming media to a variety of client systems, according to one embodiment of the invention.

Embodiments of the invention provide techniques for presenting a library of streaming video content to viewers; in particular, where the content of selected titles in the library is used to promote those titles to a viewer. One embodiment of the invention includes a method for providing a viewer with previews of selected titles from a library of streaming media titles. The method may generally include determining a set of media titles available in the library to present to the viewer on a content browsing interface on a streaming media client device, selecting a first media title from the set of streaming media titles, and streaming a preview associated with the first media title to the client device via the content browsing interface.

In a particular embodiment, the preview corresponds to a selected portion of the first media title beginning from a predetermined starting point within the first media title to access for the preview. Further, while streaming the preview associated with the first media title, the viewer may request, via the content browsing interface, to switch to a preview of a second streaming media title within the set of media titles. After presenting the preview associated with the first media title, the content browsing interface may prompt the viewer to either select to begin viewing the first media title or perform another browsing action. Alternatively, after streaming the preview associated with the first media title, a second media title from the set of media titles is selected and a preview associated with the second media title is streamed to the client device via the content browsing interface.

Additionally, in some embodiments prior to streaming the preview associated with the first media title, the viewer may be presented with a still-image associated with the first media title while the streaming media client device buffers a portion of the preview.

Description of Example Embodiments

Embodiments of the invention provide techniques for merchandising a library of streaming media content to users in an engaging manner. In one embodiment, the website of streaming media provider, or an interface provided by specialized client devices, may be configured to merchandise a library of streaming video titles available from the streaming media provider.

In particular, a set of titles in the library is merchandised to a viewer using the actual content of the selected titles. For example, instead of using lists, box shots, or other program guide data to present titles from the library, a preview of a selected title automatically begins playing when the user brings up an interface to the streaming video service. That is, when the user accesses the streaming service provider's website or launches an application configured to access the streaming service, a content browsing interface selects one or more titles from the library and automatically begins streaming one on the client. The title may be selected from a general category such as "new releases" but can also include categories specific to a particular user. For example, the set of titles may be selected based on the viewing and/or ratings history of a particular user. In such a case, the streaming media service may track what titles (or categories) have been previewed recently, preventing duplicates. Further, the particular preview can be tailored based on the viewing and/or ratings history of a particular user or based on other factors (e.g., based on time of day).

In one embodiment, the point at which the selected title begins streaming may be selected as an interesting point for that title. For example, editorial staff employed by the streaming media provider may designate start points to use for previews. Further, the preview may be limited to a specific period of time (e.g., 60 seconds or so). Once the preview completes, the interface may begin streaming a preview for another title from the library. Alternatively, the user may have to expressly select to continue watching the current title, jump to preview of another title, or to exit the content browsing interface when a preview completes.

During the preview, the user may select to continue playing the title from the streaming preview or from the beginning of the title, as well as select another title to begin previewing. Further, the interface may supplement the streaming preview with program guide data regarding the title then being previewed and other titles available to be previewed. For example, the interface may present a list of categories from which the set of preview titles are selected. In such a case, when the user selects a new category, a title from the new category begins streaming on the client device. As another alternative, the user may control the interface to jump to a "next" or "previous" preview title, each of which begins automatically streaming in a preview mode once selected. In one embodiment, the "next" and "previous" titles may be presented in a box shot overlaying a portion of the interface display. That is, the user may know in advance what title will be previewed next.

Alternatively, the interface may just begin previewing the next title for the user when requested (or when the preview of the current title ends) without presenting any indication of what the next title will be. This approach results in a browsing experience similar to changing channels on television, but does so in a manner where each change results in a preview of a new title from the streaming media library. Further, new titles may be selected specifically because they may be compelling to a particular viewer. Thus, this approach presents content available from a steaming service in an engaging manner, where the actual content of titles is used to merchandise a streaming media library. By providing a more engaging experience in this manner, users may be more likely to use a media streaming service and to watch more after they decide to use the service.

Note, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas are not been described in detail.

FIG. 1 illustrates an example computing infrastructure 100 used to provide streaming media content to client systems $130_{1-2}$, according to one embodiment of the invention. As shown, the computing infrastructure 100 includes a streaming media server system 105 and client systems $130_1$, $130_2$, each connected to a communications network 120.

The client systems $130_{1-2}$ communicate with the streaming media server system 105 over the network 120 to download streaming media titles. In this particular example, client system $130_1$ represents a computer system running a web-browser 132. Accordingly, client system $130_1$ is representative of desktop PCs, laptop computers, home-theater PCs (HTPCs), tablet computers, mobile telephones, and other computing systems capable of running a web-browser. The web-browser 132 is configured to obtain a streaming media interface 133 from the streaming media server 105, rendered on a display $140_1$, e.g., an LCD monitor.

In one embodiment, the streaming media interface 133 provides a content browsing mode used to merchandise content available from the streaming media server by presenting previews of selected titles, as described in greater detail below. Streaming media server 105 provides a computing system configured to transmit media streams (or links to media streams) to clients $130_{1-2}$. For example, streaming media server 105 may include a web-server, database, and application server configured to respond to requests for web pages and/or streaming media files received from web-browser 132. The content itself may be distributed from the streaming media server 105 or through broader content distribution networks. For example, in one embodiment, the streaming media server 105 allows a viewer to authenticate themselves to the streaming media provider (e.g., using a username and password). Once a given viewer is authenticated, the streaming media server 105 may generate a set of titles to be previewed using the streaming media interface 133. The set of titles may be transmitted to the interface 133 as a set of links (e.g., HTTP URLs) to streaming media content available from the media server 105 (or related content distribution network). Logic included in the streaming media interface 133 may then begin downloading and playback for one of the titles accessed by one of the links.

Client system 130₂ represents a set-top device connected to both network 120 and a display 140 (e.g., a flat-panel television). Accordingly, client system 130₂ is representative of digital cable boxes, digital video recorder (DVR) systems, video game consoles, and other streaming media devices, as well as DVD players capable of connecting to a network 120 and receiving and playing back media streams provided by media server 105. For example, some Blu-ray® disc players can download and execute BD-live applications. In such a case, the disc player could connect to the media server 105 and download interface components used to select and playback media streams. Further, display 140 may itself be an integrated device capable of connecting to the network 120 playing back media streams supplied by the media server 105. For example, some flat-panel television displays include integrated components used to connect to a streaming media service, video on demand services, or video sharing websites. In each of these cases, a user interface presented by the client device may allow users to browse a selected set of media titles, where the content of a given title is used to merchandise that title.

Figure 2:
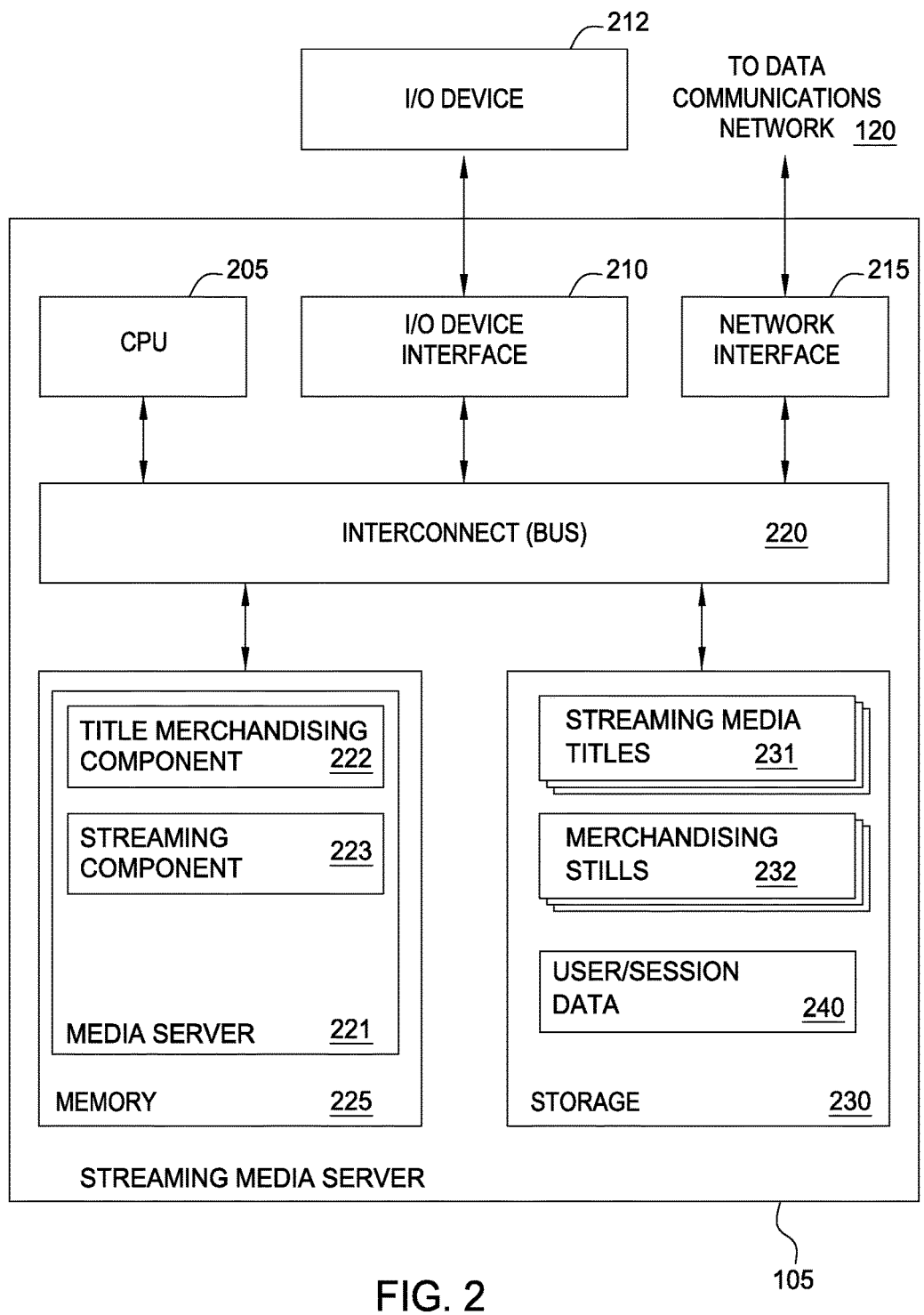
FIG. 2 illustrates an example computing system used to provide a streaming media server, according to one embodiment of the invention.

FIG. 2 illustrates an example computing system used to provide a streaming media server 105, according to one embodiment of the invention. As shown, a content server system 105 includes, without limitation, a central processing unit (CPU) 205, a network interface 215, a bus 220, a memory 225, and storage 230. The content server system 105 also includes an I/O device interface 210 to devices 212 (e.g., keyboard, display and mouse devices).

CPU 205 retrieves and executes programming instructions stored in the memory 225. Similarly, CPU 205 stores and retrieves application data residing in the memory 225. The bus 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as magnetic disc drives, solid state drives (SSD), removable memory cards, optical storage, network attached storage (NAS), or a storage area-network (SAN).

Illustratively, the memory 225 includes a media server 221, which itself includes a title merchandising component 222 and a streaming component 223. Storage 230 includes streaming media titles 231, merchandising stills 232, and user/session data 233. Streaming media titles 231 provide a library of media content available for streaming. Accordingly, the streaming media titles 321 may include a collection of audio/video data encoded at various bitrates and stored on the content server system 105. Alternatively, the streaming media titles 231 may include metadata describing the actual media files, which may be made available from a content distribution network. In such a case, the media server 221 may be configured to generate a license used by a client to obtain a given streaming media title from the content distribution network.

Media server 221 provides a software application configured to stream media titles in response to requests from clients (e.g., client systems 130₁₋₂ of FIG. 1). In one embodiment, the content server system 105 may receive a message from a client that a user has initiated a content browsing mode. In response, title merchandising component 222 of the media server 221 may determine a collection of streaming media titles 231 for use in the content browsing mode on the client 130. The list of titles may be based on a user specified content category (e.g., a request to preview action-adventure titles or newly available streaming titles). Other approaches to determine the titles to merchandise through the content browsing interface include selecting titles based on a user's prior viewing choices, a user's title ratings and expressed categorical preferences, demographic profiles, or at random (or random within a given category). Of course, a variety of other approaches may be used as well.

For example, the preview (clip) could be chosen for a particular title based on personalized information or even based on time of day. Doing so allows the streaming media service provider to merchandise or highlight not only specific titles from the catalog but also position titles based on the best clip for a particular user, e.g., by presenting a romantic scene for someone with a history of favoring romance titles and an action scene (from the same title) for a user with a history of favoring action titles. Similarly, for time of day, the preview clip could be chosen to show more sanitized or "family friendly" clips during early times of the day.

Merchandising stills 232 generally correspond to frames of video in streaming media titles 231. More specifically, a merchandising still 232 may correspond to the first frame of a video used to merchandise a given streaming media title or a frame from within a few seconds from where the preview will begin. In one embodiment, one of the merchandising stills 232 may be displayed on a client during the time that the client buffers the title being merchandised and/or obtains the license needed to authorize viewing of the title being merchandised through the content browsing interface.

Once the merchandising component 222 identifies a list of media titles, the streaming component 223 may begin streaming one of them to the client allowing a short (e.g., 30-60 seconds) preview of the title to be presented to the viewer. Additionally, the media server 221 may store an indication of what streaming media titles 231 have been merchandised to a viewer as part of a given viewing session. For example, user/session data 233 may indicate what titles were previewed, when such titles were previewed, how long the preview lasted before the user browsed to the next title, or whether the viewer decided to continue viewing a given title merchandised using the content browsing interface. Doing so allows the media server 221 to avoid repeatedly merchandising the same title to a client as part of a given viewing session (or across viewing sessions near in time to one another). It also allows for altering what preview is selected when merchandising a specific title, offering the opportunity to merchandise the same title later with a different preview (segment) of that same title to highlight a different aspect. Further, doing so allows the streaming media service provider to refine what titles are presented to other users. For example, when a user selects to view one of the streaming media titles merchandised using the content browsing interface, the probability of merchandising that title to other users may be increased. Conversely, if relatively few users select a given title merchandised using the content browsing interface, the probability of merchandising that title to other users may be decreased, or that title may ultimately be removed from being a title merchandised using the content browsing interface at all.

Figure 3:
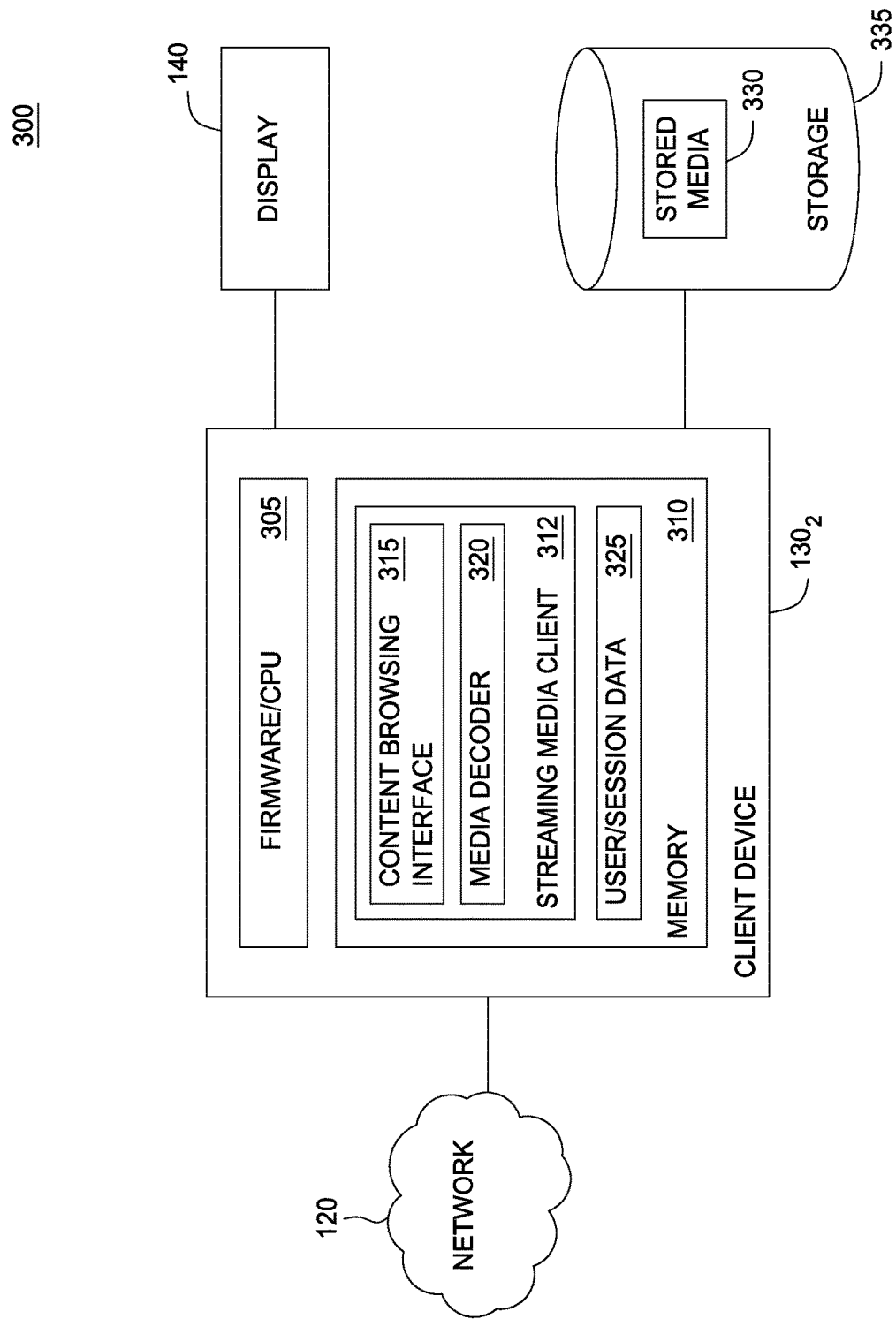
FIG. 3 illustrates an example of a client device used to view streaming media content, according to one embodiment of the invention.

FIG. 3 illustrates an example of a client device 130₂ used to view streaming media content, according to one embodiment of the invention. In this example, a streaming media client device is connected to both a display screen (e.g., a flat panel television) and a network. Accordingly, as shown, the client device $130_2$ is connected to both a network 120 and to a display 140. Note, client device $130_2$ is included to be representative of a cable-set top box, a digital video recorder (DVR), or television with integrated streaming functionality, as well as dedicated streaming devices (e.g., a Roku® device) connected to a television display. However configured, the client device $130_2$ may be capable of streaming media content from a variety of different service providers. Client device $130_2$ is also shown connected a storage repository 335 of stored media 330, representing locally stored content that is available for playback on display 140.

In one embodiment, the client device $130_2$ is configured to allow users to preview media content streamed over network 120 using a content browsing interface 315. As shown, the client device $130_2$ includes firmware 305, memory 310, and storage 335. The firmware 305 represents operating logic used to control the client device $130_2$. For example, the firmware 305 may be configured to allow users to schedule recordings, connect to streaming media services, select content for playback, as well as render an interface configured to merchandise titles available from a streaming media service. Content retrieved over the network 120 may be buffered in storage 335 prior to being decoded and presented on display 140.

Illustratively, the memory 310 includes user/session data 315 and a media client 312, which itself includes a media decoder 320 and a content browsing interface 315. The streaming media client 312 provides software on the client device $130_2$ used to access a given streaming media service. And the media decoder 320 is generally configured to decode and generate display frames from data streamed over the network 120, whether as part of content browsing interface 315 or otherwise.

In one embodiment, the content browsing interface 315 may be configured to communicate with a given streaming media service to merchandise selected titles available from that streaming media service. To that end, the streaming media client 312 may be configured to connect to a streaming media service, authenticate itself, e.g., using credentials entered by a user or stored as part of user/session data 325, and allow a user to select content to view on display 140.

In one embodiment, the user may initiate a content browsing mode, where titles available for streaming are merchandised to the viewer using previews of a selected set of the available titles. In this mode, the content browsing interface 315 may be configured to determine a set of titles available from the streaming media service to preview as part of a browsing session. Once determined, the content browsing interface 315 may obtain a merchandising still for a selected title to present while buffering audio/video data and/or obtaining a license to stream the selected title. Once the streaming media client 312 acquires a content license (if needed) and buffers a sufficient portion of the preview, the content browsing interface 315 may cause the media decoder 320 to decode and playback the preview. Note, as the preview itself may be relatively short, e.g., 30-60 seconds of video, the buffering requirements may be low. As a result, license acquisition time may dominate the latency between a request to begin a preview and when the actual playback begins. While the preview is playing, the content browsing interface 315 may allow the viewer to confirm to playback the title being previewed (either from the current point in the preview or from the beginning of the title) as well as to jump to the next title to be previewed, to exit the content browsing interface 315 (e.g., to instead select a title by searching by name or by scrolling through a list of titles or box shots), or to simply exit the streaming application entirely.

In addition to storing user credentials and account data, user/session data 325 may record what titles have been previewed to a user, how long a user viewed a given preview, or whether the preview timed out. As noted, this information may be useful in tailoring what titles are presented through the content browsing interface 315 for subsequent browsing sessions, as well as for tailoring content browsing sessions of other users.

Figure 4:
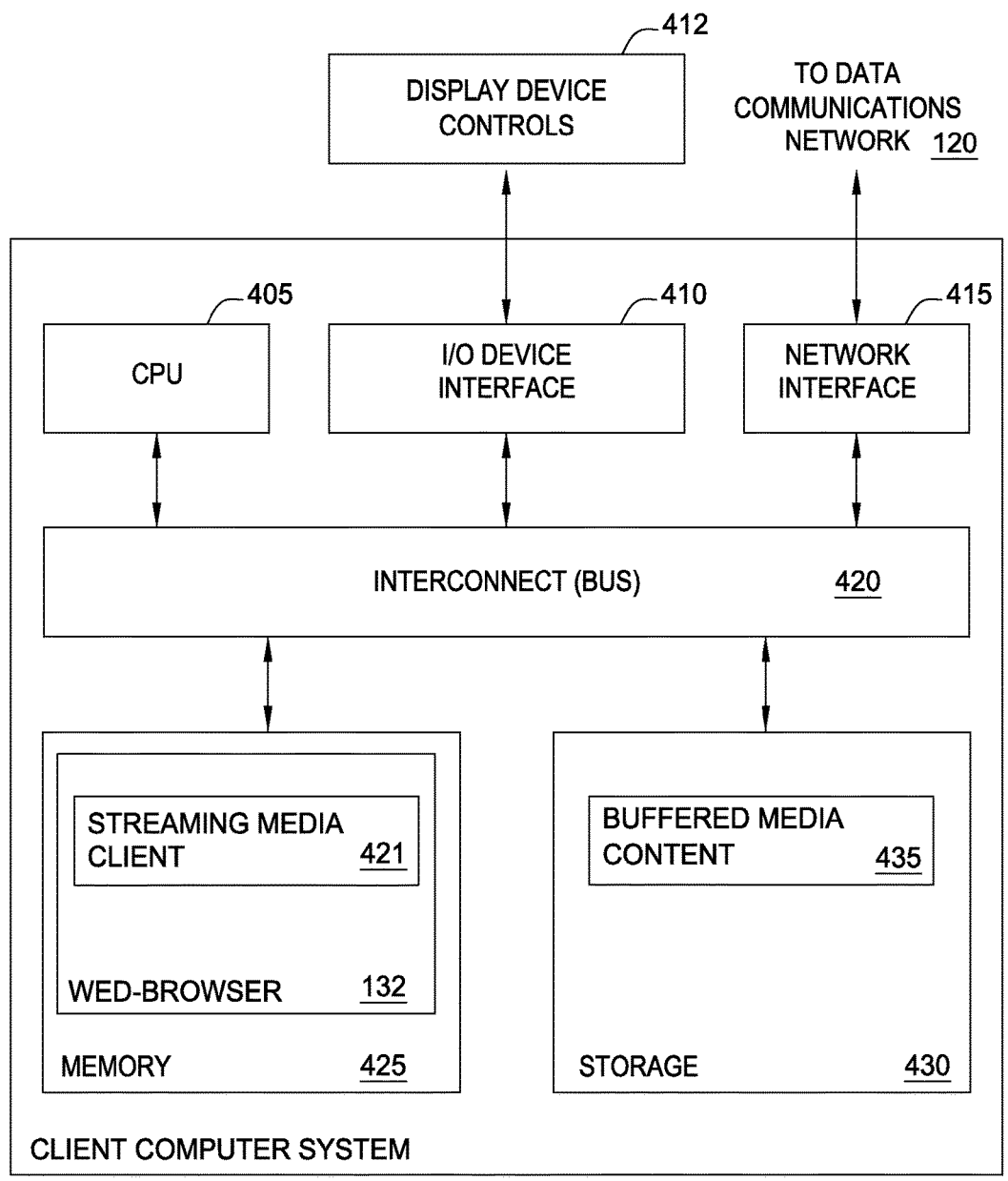
FIG. 4 illustrates an example of a computing system used to view streaming media content, according to one embodiment of the invention.

FIG. 4 illustrates an example of a client computing system $130_1$ used to view streaming media content, according to one embodiment of the invention. As shown, the client computing system $130_1$ includes, without limitation, a central processing unit (CPU) 405, a network interface 415, a bus 420, a memory 425, and storage 430. The computing system $130_1$ also includes an I/O device interface 410 connecting I/O devices 412 to the computing system $130_1$ (e.g., a keyboard, mouse, or remote control, along with a monitor (e.g., an LCD panel).

Like CPU 205, CPU 405 is included to be representative of a single CPU, multiple CPUs, a single CPU having multiple processing cores, etc., and the memory 425 is included to be representative of a random access memory. The bus 420 connects CPU 405, I/O devices interface 410, storage 430, network interface 415, and memory 225. The network interface 415 is configured to transmit data via the communications network 120, e.g., to stream media from the server system 105. Storage 430, such as a hard disk drive or solid-state (SSD) storage drive, may store audio video data files along with other content.

Illustratively, the memory 425 includes a web browser 132, which itself includes a streaming media client 421, and the storage 430 stores buffered media content 435. The browser 132 provides a software application which allows a user to access web pages and other content hosted by a server. In context of the present disclosure, the streaming media client 421 generally corresponds to software components retrieved from a streaming media service in order to playback media content from that streaming media service. Content downloaded from the streaming media service may be stored in storage 430 as buffered media content 435 prior to being decoded and played back by streaming media client 421.

The streaming media client 421 may be generally configured to provide the functionality as described above relative to the streaming media client 312 of the client device $130_2$ shown in FIG. 3. Accordingly, the streaming media client 421 may include a content browsing interface configured to merchandise a selected set of titles available from the streaming media service using short previews of the selected set of titles. Further, in one embodiment, the streaming media client 421 may include user-interface controls which allow the viewer to playback a title being previewed (either from a current point in the preview or from the beginning of the title). The streaming media client 421 may also allow the viewer to browse to the next title to be previewed or to exit the content browsing interface. For example, the user may exit the content browser interface and use the streaming media client 421 to search for a title to view using keywords or to select a title by scrolling through a list of titles or box shots), or to simply exit the streaming service entirely.

Figure 5:
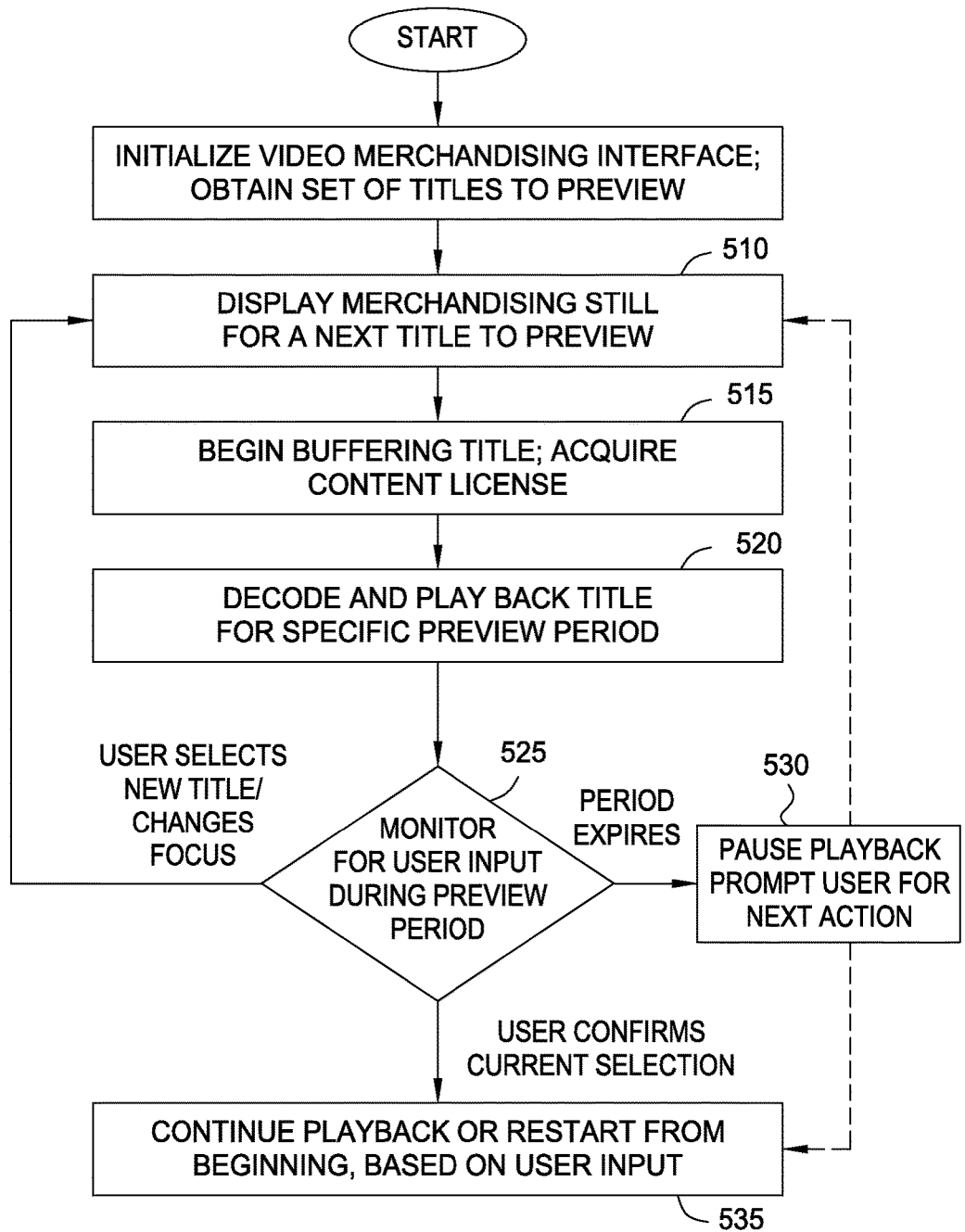
FIG. 5 illustrates a method for merchandising a library of streaming video content to viewers, according to one embodiment of the invention.

FIG. 5 illustrates a method for merchandising a library of streaming video content to viewers, according to one embodiment of the invention. As shown, the method 500 begins at step 505, where a viewer initializes a video merchandising interface to preview content from a streaming media service. For example, a viewer may initiate a content browsing interface on a set top box or DVR device capable of accessing a streaming media service, e.g., using the client device $130_2$ of FIG. 3. As another example, the viewer may use a web browser (or other software application) on a PC, laptop, tablet computer, or mobile telephone to execute a streaming media client, e.g., using the client computer system $130_1$ of FIG. 4. Once initialized, the video merchandising interface may determine a set of media titles to potentially be previewed during a content browsing session. As noted above, the titles selected to be merchandised includes selecting titles based on a viewer's prior viewing choices or using other criteria.

At step 510, the merchandising interface may display a merchandising still for a next title to be previewed. The merchandising still may provide a frame of video corresponding to the content included in the preview. While displaying the merchandising still, the interface may begin buffering the title selected to be previewed, as well as obtain any needed license or authorization, or perform any authentication needed to be completed before the preview may begin (step 515). At step 520, once enough content is buffered to playback the merchandising preview without experiencing a buffer under run or otherwise interrupting playback, the client (whether as part of a browser, software application, or specific streaming media device) begins decoding the buffered content and playing back the merchandising preview.

Once the preview begins, the client may monitor for viewer input for the duration of the merchandising preview (step 525). If the viewer takes no action, then in one embodiment, the client may cease audio/video playback at the end of the preview. In such a case, the client may present a viewer interface dialog prompting the viewer to indicate whether to continue playing the current title, jump to the beginning, jump to another title, or take some other action. If the viewer selects to continue playing the current title, then the client begins streaming the current title (step 535). If the viewer indicates to jump to another title, then the client retunes to step 510 and begins buffering a merchandising preview for another title.

Alternatively, the client may automatically begin streaming a merchandising preview for another title when the merchandising preview of the current title completes playback. That is, the client may automatically return to step 510 of method 500 at the end of each merchandising preview if no user input is received. In such a case, the client may display the merchandising still for another title and begin buffering the preview for that title.

If the viewer selects to browse to another title, then the method 500 returns to step 510 where the client again displays a merchandising still for another title and begins buffering a merchandising preview for the next selected title. This process generally continues until a user selects a title to view or exits the content browsing interface used to merchandise titles available from the media library of a streaming media service.

FIGS. 6A-6G illustrate a collection of example user interface configurations for merchandising a library of streaming video content to viewers, according to one embodiment of the invention. Of course, one of ordinary still in the art will recognize that the user interfaces shown in FIGS. 6A-6G provide example embodiments of an interface configured to merchandise titles from a streaming media library to viewers using the actual content of the titles and that such interfaces may be modified in a variety of ways to add, remove, combine user-interface elements or otherwise be tailored for use in a particular case.

Figure 6A:
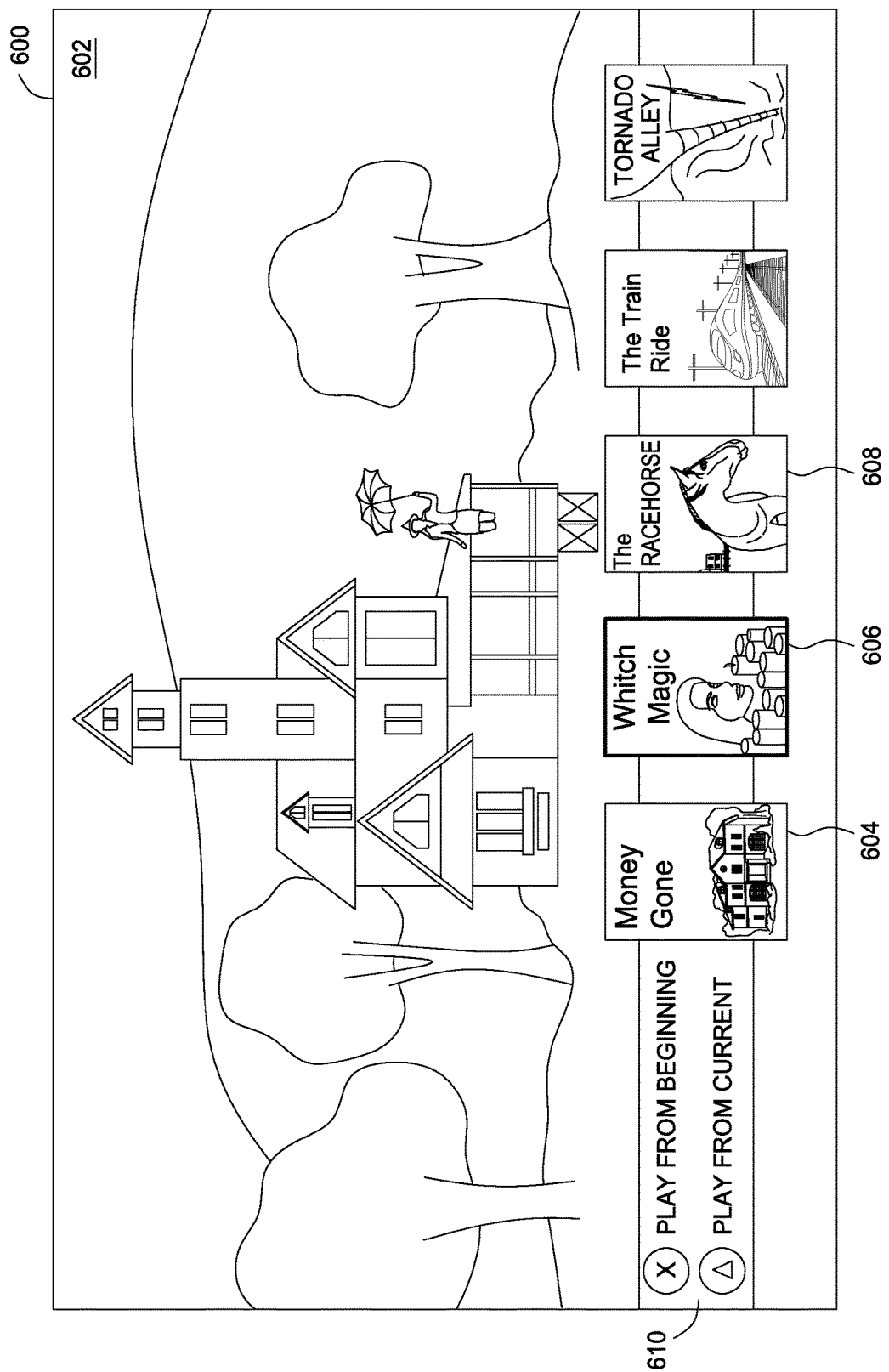
FIGS. 6A-6F illustrate a variety of example user interface configurations for merchandising a library of streaming video content to viewers, according to one embodiment of the invention.

Turning first to FIG. 6A, a video merchandising interface 600 shows a title 602 currently being previewed. The interface includes a ribbon 610 that shows a box shot 606 of the title currently being previewed (indicated by the focus box surrounding box shot 606. Additionally, ribbon 610 also shows a next title (box shot 604) and a previous title (box shot 608) previewed using the merchandising interface 600.

While the behavior of the interface may vary, in one embodiment, the focus box always remains on box shot 606, while the content of this box shot is changed, creating the impression of the titles shown in ribbon 610 "sliding" to the left or right, depending on viewer input. Alternatively, the focus box may move to the left or right in response to viewer input. In one embodiment, when the focus changes, the interface 600 may automatically begin presenting a merchandising preview for a newly selected title. Alternatively, the viewer may have to confirm a change in the merchandising preview by both changing the focus and performing another action (e.g., by pressing a button on a remote control or game console controller or clicking a button presented on a web-based interface). Ribbon 610 also provides an indication of what control buttons may be used to confirm a choice to title being shown in the preview.

Figure 6B:
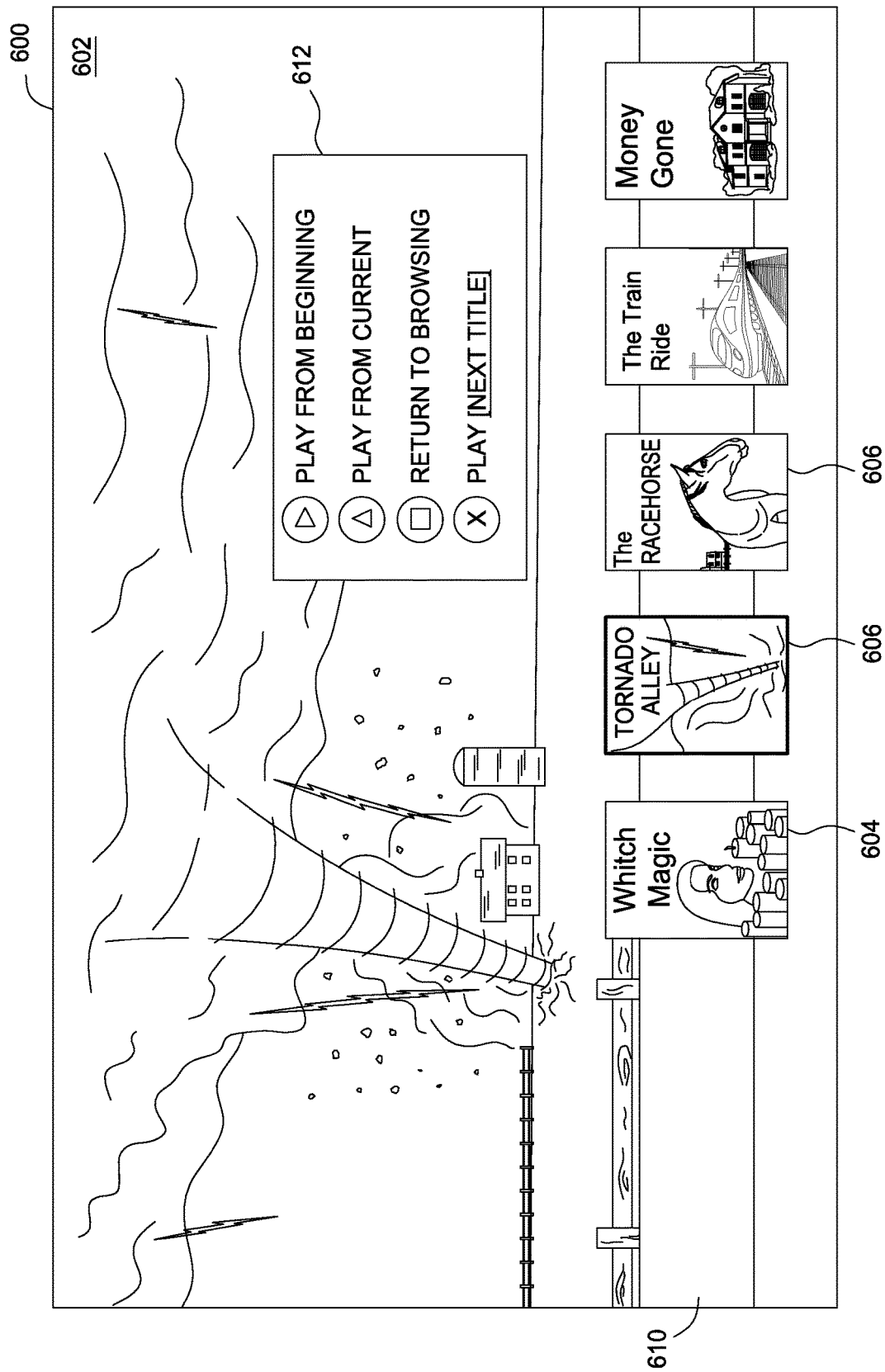

In one embodiment, the ribbon 610 is displayed for the entire merchandising preview of title 602. Alternatively, the ribbon 610 may fade out after a short period of time. In such a case, the viewer may redisplay the ribbon 610 by pressing any button on a controller and then select a desired action while the ribbon 610 is displayed. Further, as noted above, the merchandising preview of title 602 may relatively short in length (e.g., 30-60 seconds), after which the preview stops and the viewer is prompted as to what action should take place. This is shown in FIG. 6B, which illustrates the merchandising interface 600 after the preview of title 602 has completed. As shown, the ribbon bar 610 shows the box shot 604 associated with title 602, along with box shots 604 and 606. Additionally, dialog 612 overlays the display of title 602 and prompts the viewer to select a next action. In this example, the dialog 612 presents the viewer with options to play title 602 from the beginning, to continue playing title 602 from the end of the merchandising preview, to return to a conventional browsing interface, or to begin a merchandising preview of the next title (namely the title associated with box shot 606).

Figure 6C:
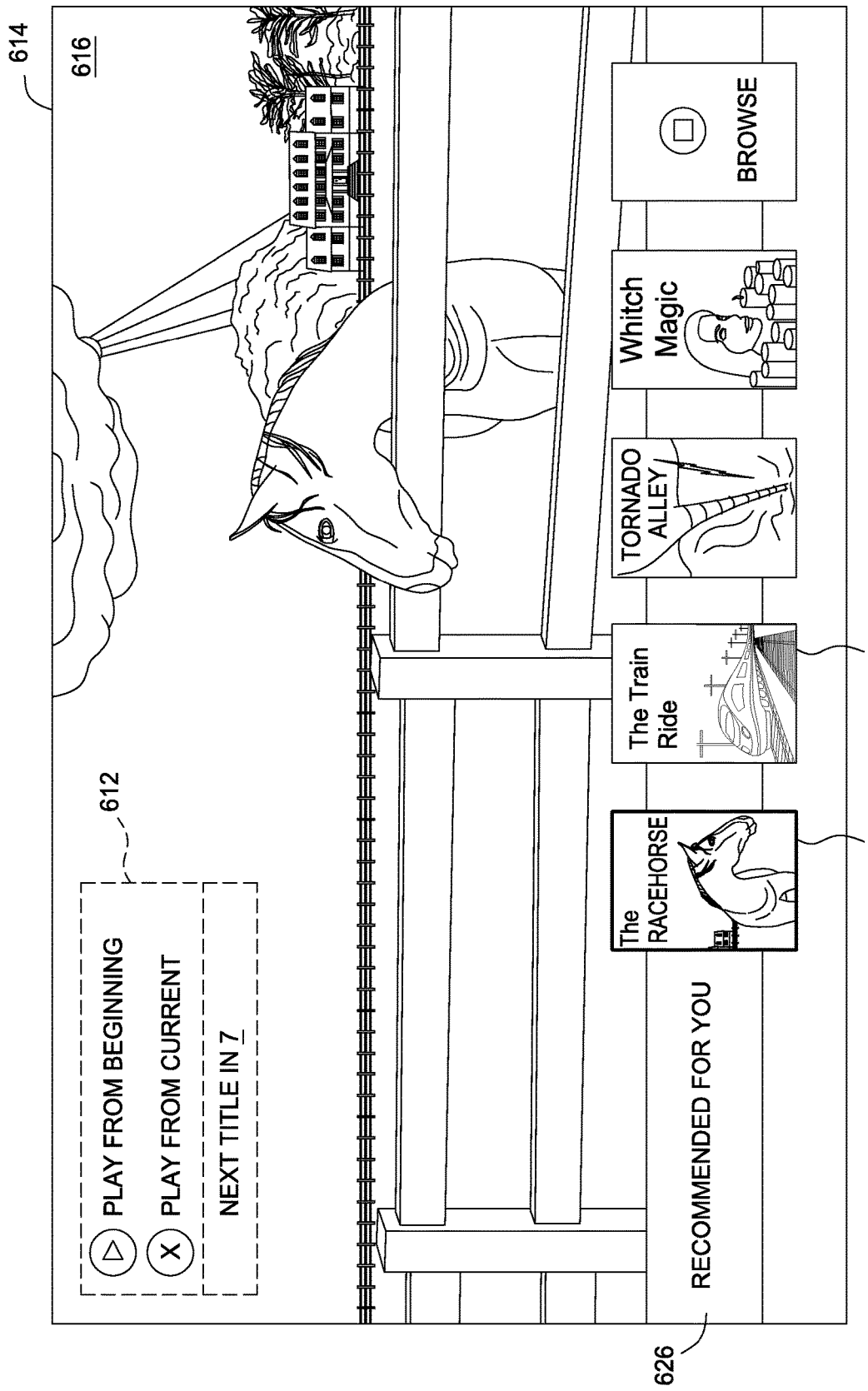

FIG. 6C presents another example user interface used to merchandise a library of streaming video files to viewers. As shown, a video merchandising interface 614 shows a title 616 currently being previewed. A ribbon 626 includes box shots 618 and 620. Title 616 corresponds to the box shot 618, highlighted with a focus box. In this example, after the preview of title 616 completes the merchandising interface 614 automatically begins previewing the next title. Specifically, the title corresponding to box shot 620. Further, the interface 614 shows a dialog box 624 presenting the user with a guide for selecting to view the currently previewed title as well as the time remaining in the preview of title 616. In one embodiment, the ribbon bar 626 and dialog box 624 fade in at the beginning of each preview and fade back out until near the end of the current preview (e.g., until the last 10 seconds). In the interim, the title 616 plays in a full-screen mode. However, the merchandising interface 614 may be configured to redisplay the ribbon 626 and/or dialog box 624 during the preview in response to user input.

Figure 6D:
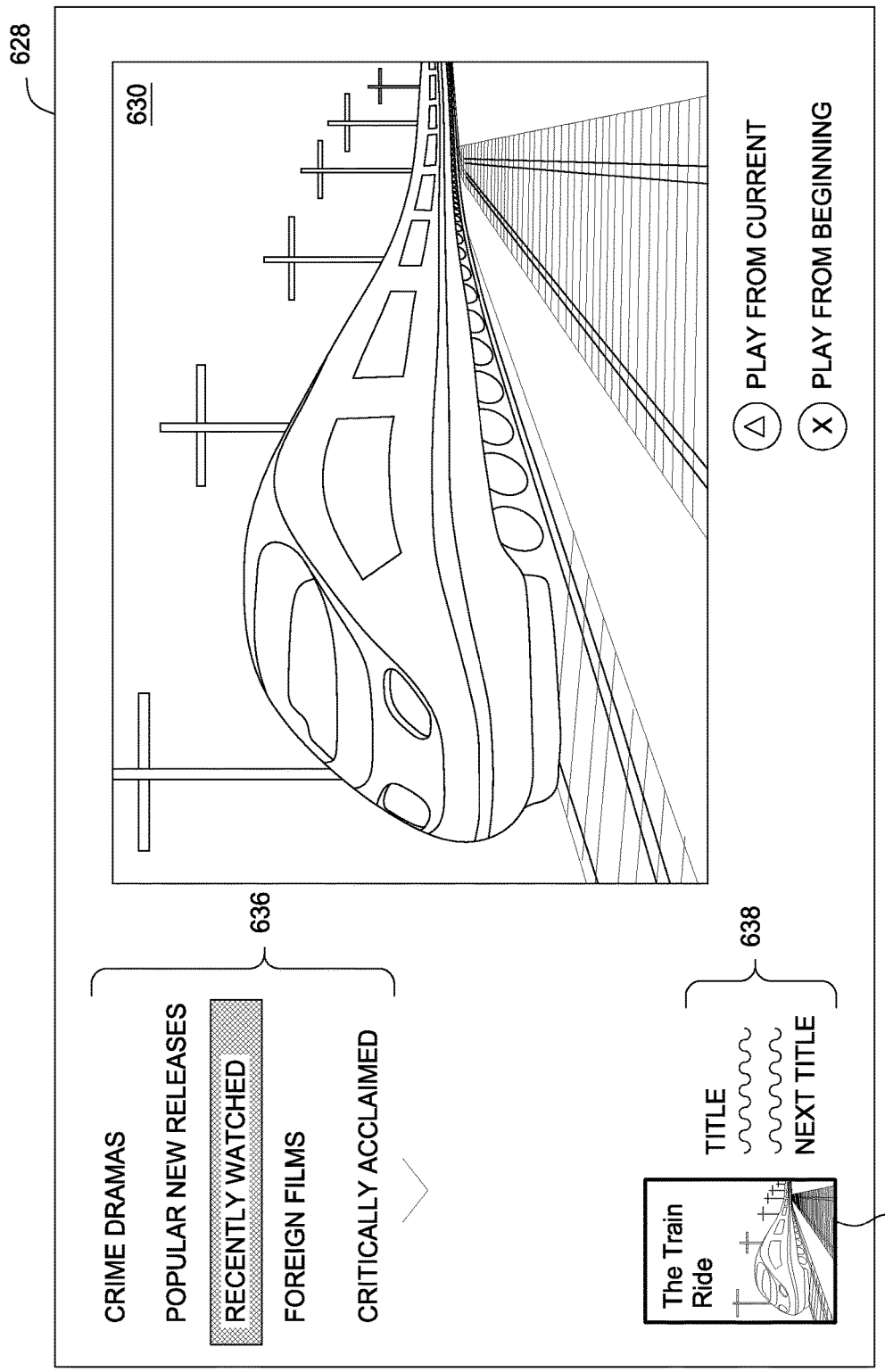

FIG. 6D presents another example user interface used to merchandise a library of streaming video files to viewers.

Unlike the examples of FIGS. 6A-6C which present a merchandising preview using a full screen mode, FIG. 6D illustrates an merchandising interface 628 where a title 630 is previewed in a smaller preview window. In this example, title 630 shown in the preview window corresponds to box shot 632. The interface 628 also presents a set of categories 636 from which preview titles may be selected. Illustratively, the title 630 is associated with a category 634 "recently watched." The user can change the preview selection from being one associated with the "recently watched" category to other categories by scrolling up or down the list 636. The interface 628 also presents program guide data 638 for the currently selected title along with hints indicating what control buttons to use to view the title 630 from the current position or from the beginning, as well as a control used to browse categories 636 or browse to the next preview title.

Figure 6E:
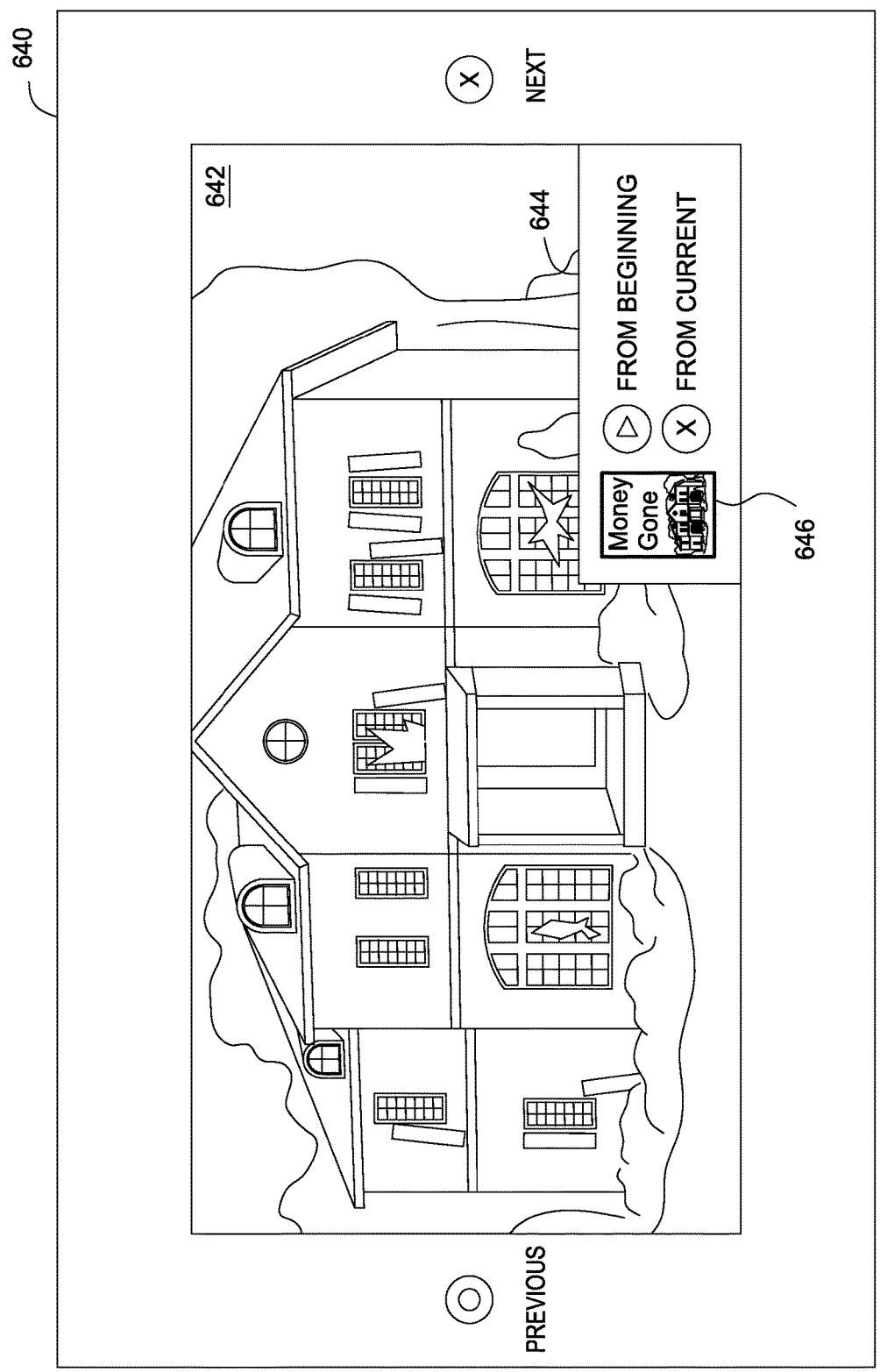

FIG. 6E presents another example of a user interface where a title is previewed using a window less than the full screen in size. As shown, a video merchandising interface 640 shows a title 642 currently being previewed. In this example, the preview window consumes almost the complete screen area, with the only other information is an indication showing what user interface controls should be used to move from one preview to another. Additionally, the interface 640 includes a dialog 644 presenting a box shot 646 for the title 642 and an indication of the controls for a viewer to confirm the selection of title 642. In one embodiment, the dialog 644 fades in at the beginning of each preview and fades back out until near the end of the current preview. If the preview of title 642 completes without any user input being received, then the interface 640 may display a dialog like the one shown in FIG. 6B, prompting the viewer to specify what action to take following the end of a merchandising preview.

Figure 6F:
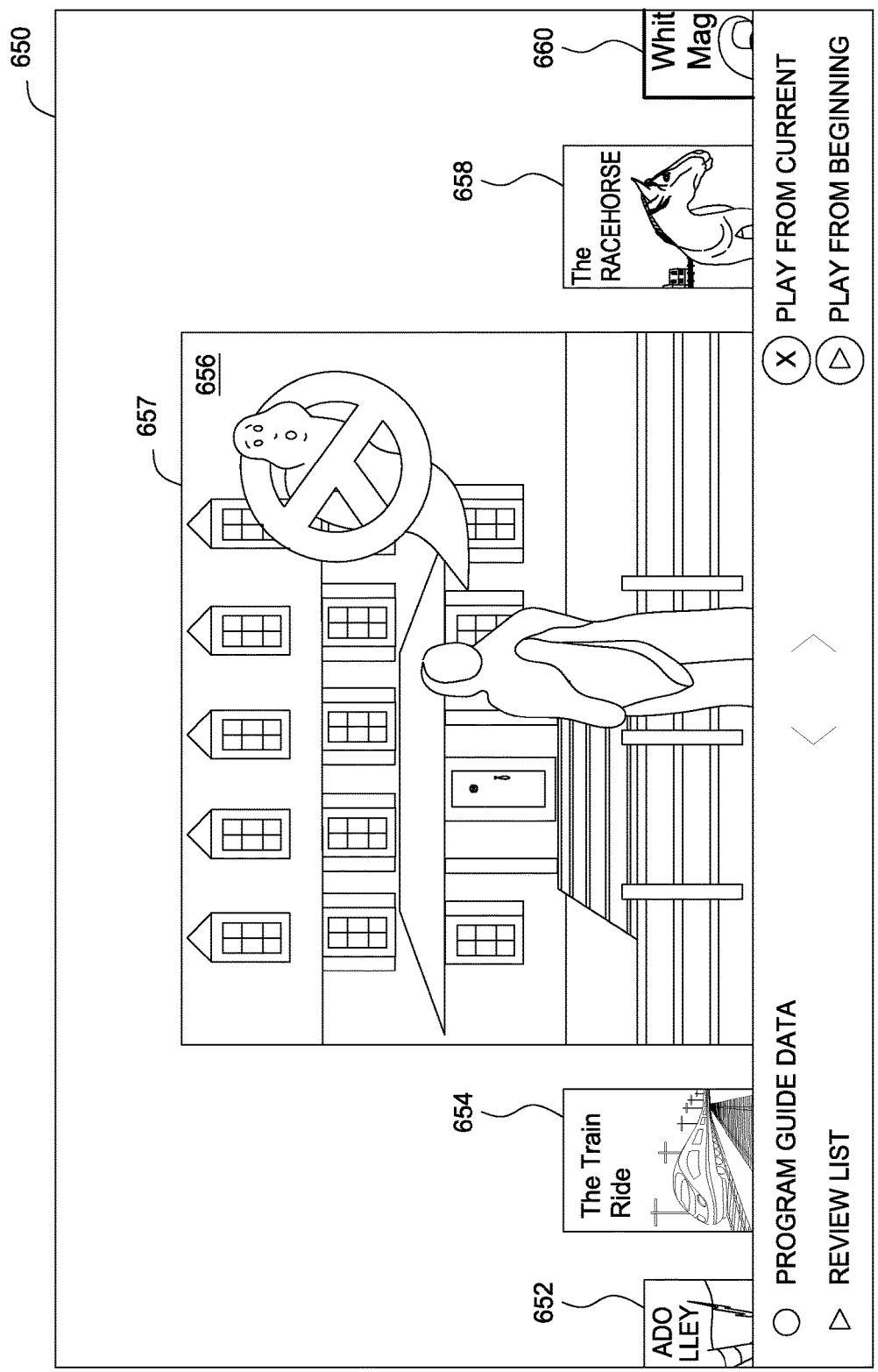

FIG. 6F presents another example user interface used to merchandise a library of streaming video files to viewers. As shown, a video merchandising interface 650 shows a title 656 currently being previewed in preview window 657. In addition, the interface shows box shots 652 and 654 to the fight of title 656 and box shots 658 and 660 showing what other titles are available to preview. In this example embodiment, assume the viewer "slides" the previewed title to the left. In response, the title associated with box shot 658 "slides" into the preview window 657 and a preview associated with that title begins playing. At the same time, the title currently playing "slides" out of the preview window 657, and a box shot corresponding to this title then appears in box shot 654. Similarly, the title shown in box shot 654 "slides" to box shot 652. On the other side of the preview window 657, the title in box 660 "slides" into box shot 658 and a box shot for a new title is selected and displayed in box shot 660. In addition to the preview window 657 and box shots 652, 654, 658 and 660, a ribbon 662 presents hints for browsing the streaming media titles using the interface 650.

While the exemplary embodiments shown in FIG. 6A-6F present a variety of user interfaces for merchandising a streaming video library, the video merchandising interfaces illustrated in these figures merchandise the streaming video library using the content of the available titles. That is, rather than rely on scrolling lists, titles, box shots, or other metadata associated with the titles available in the streaming media library, a streaming media provider can leverage the actual content from their streaming media library to merchandise available titles to users. Advantageously, by providing a more engaging experience in this manner, users may be more likely to use a media streaming service, stream more hours, as well as help the service provider increase the number of subscribers, reducing subscriber churn.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method for providing a viewer with previews of selected titles from a library of streaming media titles, the method comprising:
   determining a set of media titles available in the library to present to the viewer on a content browsing interface on a streaming media client device, based on at least one of a viewer specified content category, prior viewing choices by the viewer, title ratings by the viewer, expressed categorical preferences, demographic profiles, and at random;
   selecting or receiving a selection of a first media title from the set of streaming media titles;
   streaming a preview associated with the first media title to the client device via the content browsing interface, wherein the preview corresponds to a selected portion of the first media title beginning from a predetermined point within the first media title to access for the preview; and
   while streaming the preview associated with the first media title and in response to receiving a request via the content browsing interface to switch to a preview of a second media title within the set of media titles,
      selecting the second media title from the set of media titles, and
      streaming, to the client device via the content browsing interface, a first preview associated with the second media title, wherein the first preview is selected based on (i) a second preview associated with the second media title having previously been streamed to the client device and (ii) at least one of the prior viewing choices by the viewer, the title ratings by the viewer, and a time of day.

2. The method of claim 1, wherein the first preview associated with the second media title corresponds to a selected portion of the second media title beginning from a predetermined starting point within the second media title.

3. The method of claim 2, wherein the second media title is displayed in a box shot on the content browsing interface while streaming the preview associated with the first media title.

4. The method of claim 1, further comprising:
prior to streaming the preview associated with the first media title, presenting a still-image associated with the first media title while also buffering a portion of the preview.

5. The method of claim 1, wherein at least a portion of the content browsing interface fades out after the preview associated with the first media title begins to be displayed and fades back in before ending the display of the preview.

6. The method of claim 1, wherein the client device comprises one of a cable set-top box, personal computer, mobile telephone, tablet computer and a digital video recorder.

7. The method of claim 1, wherein the preview of the first media title is selected, based in part, on either a viewing history associated with the viewer or a viewer profile.

8. The computer-implemented method of claim 1, further comprising, while streaming the preview associated with the first media title, causing an interface to be presented to the viewer to present the viewer with at least a first options of continuing playing back the first media title from a position of the preview and a second option of playing back the first media title from the beginning of the first media title.

9. The computer-implemented method of claim 1, further comprising:
storing a first indication indicating that the preview associated with the first media title has been streamed and indicating that the first media title was not selected to be played back;
storing a second indication indicating that the first preview associated with the second media title has been streamed; and
selecting a third preview to stream to the client device via the content browsing interface based on at least one of the first indication and the second indication.

10. A non-transitory computer-readable storage medium storing code for execution by a processor, wherein the code, when executed, performs an operation for providing a viewer with previews of selected titles from a library of streaming media titles, the operation comprising:
determining a set of media titles available in the library to present to the viewer on a content browsing interface on a streaming media client device, based on at least one of a viewer specified content category, prior viewing choices by the viewer, title ratings by the viewer, expressed categorical preferences, demographic profiles, and at random;
selecting or receiving a selection of a first media title from the set of streaming media titles;
streaming a preview associated with the first media title to the client device via the content browsing interface, wherein the preview corresponds to a selected portion of the first media title beginning from a predetermined point within the first media title to access for the preview, wherein the predetermined point is determined prior to determining the set of media titles to present to the viewer; and
while streaming the preview associated with the first media title and in response to receiving a request via the content browsing interface to switch to a preview of a second media title within the set of media titles, selecting the second media title from the set of media titles, and
streaming, to the client device via the content browsing interface, a first preview associated with the second media title, wherein the first preview is selected based on (i) a second preview associated with the second media title having previously been streamed to the client device and (ii) at least one of the prior viewing choices by the viewer, the title ratings by the viewer, and a time of day.

11. The non-transitory computer-readable storage medium of claim 10, wherein the first preview associated with the second media title corresponds to a selected portion of the second media title beginning from a predetermined starting point within the second media title.

12. The non-transitory computer-readable storage medium of claim 10, wherein the operation further comprises:
prior to streaming the preview associated with the first media title, presenting a still-image associated with the first media title while also buffering a portion of the preview.

13. A system, comprising:
a memory; and
a processor storing one or more applications, which, when executed on the processor, perform an operation for providing a viewer with previews of selected titles from a library of streaming media titles, the operation comprising:
determining a set of media titles available in the library to present to the viewer on a content browsing interface on a streaming media client device, based on at least one of a viewer specified content category, prior viewing choices by the viewer, title ratings by the viewer, expressed categorical preferences, demographic profiles, and at random,
selecting or receiving a selection of a first media title from the set of streaming media titles,
streaming a preview associated with the first media title to the client device via the content browsing interface, wherein the preview corresponds to a selected portion of the first media title beginning from a predetermined point within the first media title to access for the preview, and
while streaming the preview associated with the first media title and in response to receiving a request via the content browsing interface to switch to a preview of a second media title within the set of media titles, selecting the second media title from the set of media titles, and
streaming, to the client device via the content browsing interface, a first preview associated with the second media title, wherein the first preview is selected based on (i) a second preview associated with the second media title having previously been streamed to the client device and (ii) at least one of the prior viewing choices by the viewer, the title ratings by the viewer, and a time of day.

14. The system of claim 13, wherein the first preview associated with the second media title corresponds to a selected portion of the second media title beginning from a predetermined starting point within the second media title.

15. The system of claim 13, wherein the operation further comprises: prior to streaming the preview associated with the first media title, presenting a still-image associated with the first media title while also buffering a portion of the preview.

16. The system of claim 13, wherein the client device is one of a cable set-top box, personal computer, mobile telephone, tablet computer and a digital video recorder.

* * * * *